United States Patent
Peng (10) Patent No.: US 9,525,843 B2
(45) Date of Patent: Dec. 20, 2016

(54) MULTIMEDIA FILE PLAYBACK METHOD, PLAYBACK APPARATUS AND SYSTEM

(71) Applicant: Huawei Technologies Co., Ltd., Shenzhen, Guangdong (CN)

(72) Inventor: Tiejun Peng, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 98 days.

(21) Appl. No.: 14/490,250

(22) Filed: Sep. 18, 2014

(65) Prior Publication Data
US 2015/0131970 A1    May 14, 2015

(30) Foreign Application Priority Data
Oct. 11, 2013    (CN) .......................... 2013 1 0474195

(51) Int. Cl.
| | |
|---|---|
| *H04N 9/80* | (2006.01) |
| *H04N 5/935* | (2006.01) |
| *G11B 27/034* | (2006.01) |
| *G11B 27/28* | (2006.01) |
| *G11B 27/32* | (2006.01) |

(52) U.S. Cl.
CPC ............ *H04N 5/935* (2013.01); *G11B 27/034* (2013.01); *G11B 27/28* (2013.01); *G11B 27/322* (2013.01)

(58) Field of Classification Search
CPC ................................ H04N 9/8042; H04N 5/85
USPC .................................. 386/239, 241, 248, 263
See application file for complete search history.

(56) References Cited

U.S. PATENT DOCUMENTS

| | | | | |
|---|---|---|---|---|
| 8,204,919 B2* | 6/2012 | Oka | ....................... | G11B 20/10 382/302 |
| 8,315,503 B2* | 11/2012 | Shimazaki | ........... | G11B 27/105 386/225 |
| 8,422,865 B2* | 4/2013 | Lin | ...................... | H04N 9/8042 386/248 |
| 2007/0146820 A1* | 6/2007 | Asazu | ................... | H04H 60/27 358/479 |
| 2007/0186162 A1 | 8/2007 | Kaku | | |
| 2008/0235580 A1 | 9/2008 | Gonze et al. | | |
| 2008/0263608 A1 | 10/2008 | White | | |
| 2010/0070608 A1 | 3/2010 | Hosur | | |
| 2010/0185776 A1 | 7/2010 | Hosur et al. | | |
| 2011/0225454 A1 | 9/2011 | Fan | | |

(Continued)

FOREIGN PATENT DOCUMENTS

| | | |
|---|---|---|
| CN | 1252570 A | 5/2000 |
| CN | 101072340 A | 11/2007 |

(Continued)

*Primary Examiner* — Thai Tran
*Assistant Examiner* — Mishawn Hunter (57) ABSTRACT

This application discloses a multimedia file playback method, a playback apparatus, and a system. The multimedia playback method includes: when a multimedia file is run for the first time, generating a media auxiliary file for the multimedia file and establishing a mapping relationship between the multimedia file and the media auxiliary file, where the media auxiliary file includes a correction parameter that is used to correct a parameter of the multimedia file; when the multimedia file is played again, searching for the media auxiliary file according to the mapping relationship, and correcting the multimedia file according to the correction parameter in the media auxiliary file.

12 Claims, 4 Drawing Sheets

(56) References Cited

U.S. PATENT DOCUMENTS

2011/0239078 A1 9/2011 Luby et al.
2013/0007005 A1 1/2013 Chen et al.

FOREIGN PATENT DOCUMENTS

| | | |
|---|---|---|
| CN | 101076106 A | 11/2007 |
| CN | 101127879 A | 2/2008 |
| CN | 101420317 A | 4/2009 |
| CN | 101552646 A | 10/2009 |
| CN | 101552651 A | 10/2009 |
| CN | 101636730 A | 1/2010 |
| CN | 102210160 A | 10/2011 |
| CN | 102301679 A | 12/2011 |
| CN | 102347045 A | 2/2012 |
| CN | 102549999 A | 7/2012 |
| CN | 102625193 A | 8/2012 |
| EP | 2 538 413 A1 | 12/2012 |

\* cited by examiner

*Important playback technical parameters:*

*File container: avi*

*...*

*Audio parameter:*

*Number of audio streams: 2*

*Audio stream PID[0]: 1234*

*Audio stream PID[1]: 1235*

*Audio encoding format: mp3*

*...*

*Video parameter:*

*Number of video streams: 1*

*Video stream PID: 1236*

*Video encoding format: h264*

*Video frame rate: 30fps*

MULTIMEDIA FILE PLAYBACK METHOD, PLAYBACK APPARATUS AND SYSTEM

CROSS-REFERENCE TO RELATED APPLICATION

This application claims priority to Chinese Patent Application No. 201310474195.9, filed on Oct. 11, 2013, which is hereby incorporated by reference in its entirety.

TECHNICAL FIELD

The present invention relates to the multimedia field, and in particular, to a multimedia file playback method, a playback apparatus, and a system.

BACKGROUND

With popularization of recording and camera devices, there are increasingly more situations in which a user independently records, cuts, and performs synthesizing on audio and videos to create a multimedia file. Because such self-made multimedia files created in the forgoing situations may not strictly conform to an audio or video file standard, a series of problems are likely to occur when these multimedia files are played. Typical problems include: failure to obtain total duration of a multimedia file or obtaining incorrect duration, failure to perform a seek operation or long seek operation time, long time between clicking of a play button by a user and normal playback, or failure to play a file, and the like.

In the prior art, some players may correct a parameter of a multimedia file with a problem so that the multimedia file may be played; however, the multimedia file with a problem needs to be corrected each time it is played. Therefore, a sound or a picture or both of the multimedia file may not be presented in a timely manner when the multimedia file is played, thereby leading to poor user experience.

SUMMARY

In view of this, the present invention provides a multimedia file playback method, a playback apparatus, and a system, to achieve a purpose of improving user experience.

According to a first aspect, an embodiment of the present invention provides a multimedia playback method, including:

when a multimedia file is played for the first time, generating a media auxiliary file for the multimedia file and establishing a mapping relationship between the multimedia file and the media auxiliary file, where the media auxiliary file includes a correction parameter that is used to correct a parameter of the multimedia file; and when the multimedia file is played again, searching for the media auxiliary file according to the mapping relationship, and correcting the multimedia file according to the correction parameter in the media auxiliary file.

In a first possible implementation manner of the first aspect, the correction parameter includes:

a parameter that is used to correct at least one of total duration, start time, end time, and a seek index of the multimedia file.

In a second possible implementation manner of the first aspect, the mapping relationship includes that a file name of the media auxiliary file is the same as a file name of the corresponding multimedia file.

According to a second aspect, an embodiment of the present invention further provides another multimedia playback method, including:

when a multimedia file is run for the first time, presetting a media auxiliary file for the multimedia file and establishing a mapping relationship between the multimedia file and the media auxiliary file, where the media auxiliary file includes a playback technical parameter corresponding to the multimedia file; and when the multimedia file is played again, searching for the media auxiliary file according to the mapping relationship, and acquiring a file parsing result of the multimedia file according to the corresponding playback technical parameter in the media auxiliary file.

In a first possible implementation manner of the second aspect, the playback technical parameter includes:

one or a combination of any of a file container type, the number of audio bitstreams, a PID of each audio bitstream, an audio container type, an audio encoding format, the number of video streams, a PID of each video stream, a video encoding format, and a video frame rate.

In a second possible implementation manner of the second aspect, a file name of the media auxiliary file is the same as a file name of the corresponding multimedia file.

According to a third aspect, an embodiment of the present invention further provides a multimedia playback apparatus, including:

a media auxiliary file generating unit, configured to, when the multimedia file is run for the first time, generate a media auxiliary file for a multimedia file and establish a mapping relationship between the multimedia file and the media auxiliary file, where the media auxiliary file includes a correction parameter that is used to correct a parameter of the multimedia file; and a parameter correcting unit, configured to, when the multimedia file is played again, search for the media auxiliary file according to the mapping relationship, and correct the multimedia file according to the correction parameter in the media auxiliary file.

In a first possible implementation manner of the third aspect, the correction parameter includes:

a parameter that is used to correct at least one of total duration, start time, end time, and a seek index of the multimedia file.

In a second possible implementation manner of the third aspect, a file name of the media auxiliary file is the same as a file name of the corresponding multimedia file.

According to a fourth aspect, an embodiment of the present invention further provides a multimedia playback system, including:

a media auxiliary file generating unit, configured to, when the multimedia file is run for the first time, generate a media auxiliary file for a multimedia file and establish a mapping relationship between the multimedia file and the media auxiliary file, where the media auxiliary file includes a correction parameter that is used to correct a parameter of the multimedia file; and a parameter correcting unit, configured to, when the multimedia file is played again, search for the media auxiliary file according to the mapping relationship, and correct the multimedia file according to the correction parameter in the media auxiliary file.

According to a fifth aspect, an embodiment of the present invention further provides another multimedia playback apparatus, including:

a media auxiliary file generating unit, configured to, when the multimedia file is run for the first time, preset a media auxiliary file for a multimedia file and establish a mapping relationship between the multimedia file and the media auxiliary file, where the media auxiliary file includes a playback technical parameter corresponding to the multimedia file; and a parameter correcting unit, configured to, when the multimedia file is played again, search for the media auxiliary file according to the mapping relationship, and acquire a file parsing result of the multimedia file according to the corresponding playback technical parameter in the media auxiliary file.

In a first possible implementation manner of the fifth aspect, the playback technical parameter includes:

one or a combination of any of a file container type, the number of audio bitstreams, a PID of each audio bitstream, an audio container type, an audio encoding format, the number of video streams, a PID of each video stream, a video encoding format, and a video frame rate.

In a second possible implementation manner of the fifth aspect, a file name of the media auxiliary file is the same as a file name of the corresponding multimedia file.

According to a sixth aspect, an embodiment of the present invention further provides another multimedia playback system, including:

a media auxiliary file generating unit, configured to, when the multimedia file is run for the first time, preset a media auxiliary file for a multimedia file and establish a mapping relationship between the multimedia file and the media auxiliary file, where the media auxiliary file includes a playback technical parameter corresponding to the multimedia file; and a parameter correcting unit, configured to, when the multimedia file is played again, search for the media auxiliary file according to the mapping relationship, and acquire a file parsing result of the multimedia file according to the corresponding playback technical parameter in the media auxiliary file.

It may be learned from the foregoing technical solutions that, in this application, a media auxiliary file is preset for a multimedia file, and a correction parameter for correcting a parameter of a non-standard media file is stored in the media auxiliary file, so that the correction parameter can be directly acquired when the non-standard multimedia file is played. In the multimedia playback method in this application, it is unnecessary to perform parameter correction each time the non-standard multimedia file is played, therefore, waiting time of a user is reduced, and user experience is further improved when the user plays the multimedia file.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
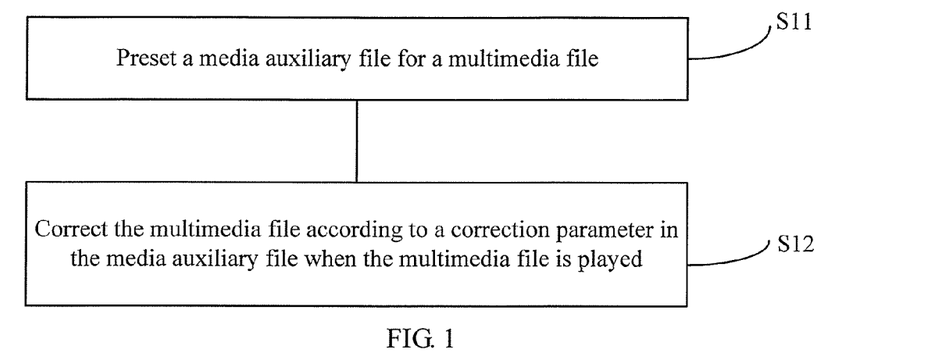
FIG. 1 is a schematic flowchart of a multimedia playback method according to this application.

To achieve a purpose of user experience when a multimedia file is played, in one aspect of the present invention, a multimedia playback method is provided, as shown in FIG. 1, the following steps are included:

S11. When the multimedia file is run for the first time, generate a media auxiliary file for the multimedia file and establish a mapping relationship between the multimedia file and the media auxiliary file, where the media auxiliary file includes a correction parameter that is used to correct a parameter of the multimedia file; and when the multimedia file is played again, search for the media auxiliary file according to the mapping relationship and correct the multimedia file according to the correction parameter in the media auxiliary file.

In a practical application, there are an increasing number of self-made multimedia files. However, a series of problems are likely to occur because the self-made multimedia files may not strictly conform to an audio or video file standard. The problems include, for example, failure to obtain total duration of the multimedia file or obtaining incorrect duration, failure to perform a seek operation or long seek operation time, long time between clicking of a play button by a user and normal playback, or failure to play a file.

To play these non-standard multimedia files, an existing player can perform parameter correction for the non-standard multimedia files and play the non-standard multimedia files after obtaining correct parameters.

Although an existing player can play non-standard multimedia files, parameter correction needs to be performed each time a non-standard multimedia file is played, and the parameter correction takes some time. Therefore, each time a non-standard multimedia file is played, a user needs to wait for a period of time after a playback command operation is performed, thereby leading to poor user experience.

To address the foregoing deficiency, in the present invention, the media auxiliary file is preset for the multimedia file and the mapping relationship between the multimedia file and the media auxiliary file is established, where the media auxiliary file includes the correction parameter corresponding to the multimedia file, and the correction parameter is a parameter that is used to correct at least one of total duration, start time, end time, and a seek index of the multimedia file. Specifically, correction parameters are obtained when parameter correction is performed on the non-standard multimedia file by using a player, and these correction parameters are stored in the media auxiliary file. The obtained correction parameters are corresponding to the multimedia files, that is, each multimedia file with a generated media auxiliary file corresponds to a specific correction parameter.

Specifically, in a practical application, the parameter correction may be generally performed when the multimedia file is played for the first time. Therefore, the media auxiliary file is generally preset for the multimedia file when the multimedia file is played for the first time. In the practical application, the correction parameter may include one or a combination of any of the total duration, the start time, the end time, or the seek index of the multimedia file, that is, the corresponding total duration, start time, end time, seek index, or the like of the multimedia file are corrected by using a corrected result parameter. In addition, the correction parameter may also be a difference parameter. That is, the correction parameter is a difference between a parameter of the multimedia file before parameter correction and a parameter of the multimedia file after parameter correction. In this way, when the multimedia file is played again, a correct parameter may be obtained by means of difference calculation. For example, if total duration of the multimedia file before correction is n seconds more than total duration of the multimedia file after correction, the correction parameter may be n; when the multimedia file is played again, total duration after correction, that is, correct total duration of the multimedia file, may be obtained by adding the total duration of the multimedia file before correction to the correction parameter n. Certainly, a correction parameter that is used to correct start time, end time, or a seek index may also be set in a similar manner.

S12. When the multimedia file is played again, search for the media auxiliary file according to the mapping relationship, and correct the multimedia file according to the correction parameter in the media auxiliary file.

The correction parameter corresponding to the multimedia file has already been stored in the media auxiliary file. Therefore, when the multimedia file is played again, the corresponding correction parameter may be obtained from the media auxiliary file according to the mapping relationship between the multimedia file and the media auxiliary file. Therefore, when a non-standard multimedia file is played, because a media auxiliary file has been preset for the non-standard multimedia file, it is unnecessary to correct the parameter each time the non-standard multimedia file is played, thereby speeding up a playback process, reducing waiting time of a user, and further improving user experience.

In a practical application, a specific implementation process of the present invention includes:

Media auxiliary files may be generated for all multimedia files, or media auxiliary files may be generated only for non-standard multimedia files for which parameter correction has been performed. If a multimedia file is a standard multimedia file, that is, no parameter correction is required, the correction parameter corresponding to the multimedia file may be blank, or there may be no corresponding correction parameter. If the multimedia file is a non-standard multimedia file, when a player plays the non-standard multimedia file for the first time, the correction parameter that is used by the player to correct a parameter of the non-standard multimedia file may be obtained. Specifically, one or a combination of any of total duration, start time, end time, or a seek index of the multimedia file that has been corrected by the player may be obtained. After correct parameters, that is, correction parameters, are obtained, these correction parameters are stored in a media auxiliary file.

Figure 2:
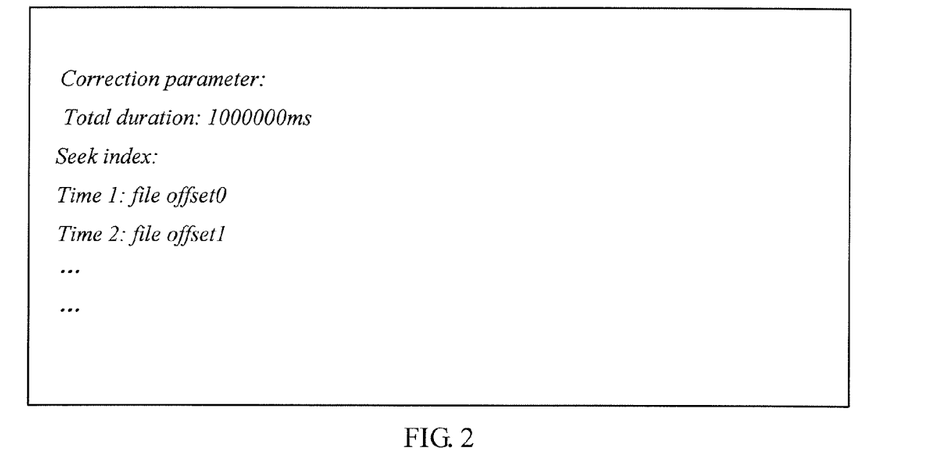
FIG. 2 is a schematic diagram of a format of a media auxiliary file according to this application.

In this application, a specific format of a correction parameter stored in a media auxiliary file may be that shown in FIG. 2. A format of the media auxiliary file may be a TXT, or may be an XML or a binary, or may be another type defined by a user, or may be another format, as long as similar information is included. This is not limited herein.

To make the stored correction parameter correspond to the multimedia file so that the corresponding correction parameter may be easily found when the multimedia file is played, in this application, a file name of the media auxiliary file may further be set to be the same as a file name of the multimedia file. For example, for a multimedia file whose file name is 001.vai, a media auxiliary file generated for the multimedia file may be 001.maf, that is, the file name of the media auxiliary file and the file name of the corresponding multimedia file are the same, and they are identified and distinguished by using a file type.

Figure 3:
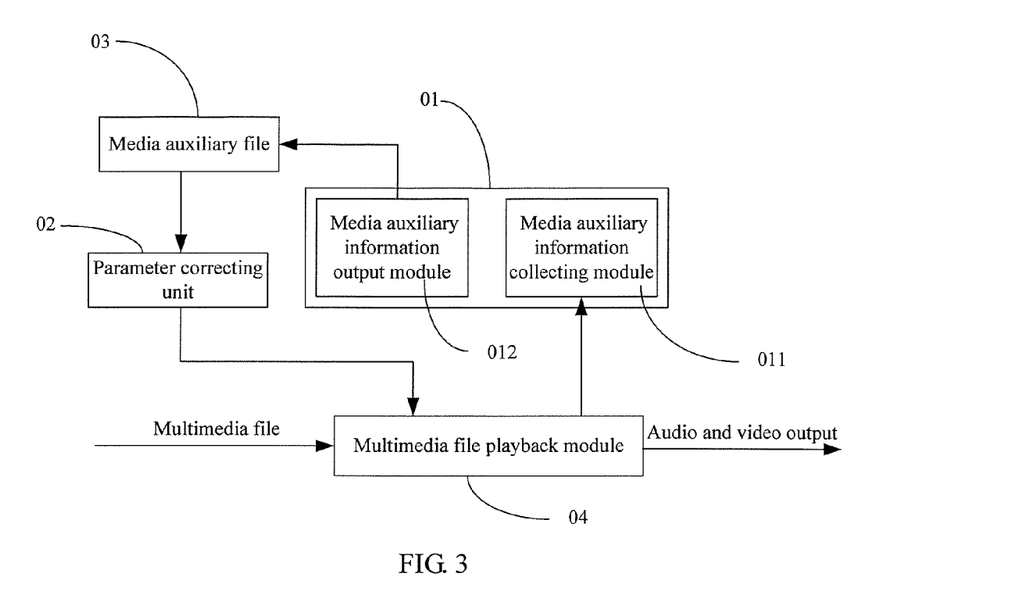
FIG. 3 is a schematic structural diagram of a multimedia playback apparatus according to this application.

Corresponding to the embodiment of the multimedia playback method shown in FIG. 1, in another aspect of this application further, a multimedia playback apparatus is provided, as shown in FIG. 3, including:

a media auxiliary file generating unit 01, configured to preset a media auxiliary file 03 for a multimedia file and establish a mapping relationship between the multimedia file and the media auxiliary file 03, where the media auxiliary file 03 includes a correction parameter that is used to correct a parameter of the multimedia file; and a parameter correcting unit 02, configured to, when the multimedia file is played again, search for the media auxiliary file 03 according to the mapping relationship, and correct the multimedia file according to the correction parameter in the media auxiliary file 03.

To play a non-standard multimedia file, an existing player may correct a parameter of the non-standard multimedia file and play the non-standard multimedia file after a correct parameter is obtained.

Although an existing player can play non-standard multimedia files, parameter correction needs to be performed each time a non-standard multimedia file is played, and the parameter correction takes some time. Therefore, each time a non-standard multimedia file is played, a user needs to wait for a period of time after a playback command operation is performed, thereby leading to poor user experience.

To address the foregoing deficiency, in the present invention, the media auxiliary file generating unit 01 is configured to preset the media auxiliary file 03 for the multimedia file, and establish the mapping relationship between the multimedia file and the media auxiliary file 03, where the media auxiliary file 03 includes the correction parameter corresponding to the multimedia file, and the correction parameter is a parameter that is used to correct at least one of total duration, start time, end time, and a seek index of the multimedia file. Specifically, the media auxiliary file generating unit 01 may include a media auxiliary information collecting module 011 and a media auxiliary information output module 012. When a player corrects parameters of a non-standard multimedia file by using a multimedia file playback module 04, the media auxiliary information collecting module 011 obtains the correction parameters, and the media auxiliary information output module 012 stores correction parameters in the media auxiliary file 03. The obtained correction parameters are corresponding to the multimedia file, that is, each multimedia file with a generated media auxiliary file 03 corresponds to a specific correction parameter.

Specifically, in a practical application, the parameter correction may be generally performed when the multimedia file is played for the first time. Therefore, the media auxiliary file 03 is generally preset for the multimedia file when the multimedia file is played for the first time. In the practical application, the correction parameter may include one or a combination of any of the total duration, the start time, the end time, or the seek index of the multimedia file, that is, the corresponding total duration, start time, end time, seek index, or the like of the multimedia file are corrected by using a corrected result parameter. In addition, the correction parameter may also be a difference parameter. That is, the correction parameter is a difference between a parameter of the multimedia file before parameter correction and a parameter of the multimedia file after parameter correction. In this way, when the multimedia file is played again, a correct parameter may be obtained by means of difference calculation. For example, if total duration of the multimedia file before correction is n seconds more than total duration of the multimedia file after correction, the correction parameter may be n; when the multimedia file is played again, total duration after correction, that is, correct total duration of the multimedia file, may be obtained by adding the total duration of the multimedia file before correction to the correction parameter n. Certainly, a correction parameter that is used to correct start time, end time, or a seek index may also be set in a similar manner.

The correction parameter corresponding to the multimedia file has already been stored in the media auxiliary file 03. Therefore, when the multimedia file is played again by the multimedia file playback module 04, the corresponding correction parameter may be obtained by the parameter correcting unit 02 from the media auxiliary file. Therefore, when the non-standard multimedia file is played, because the media auxiliary file 03 has been preset for the non-standard multimedia file, it is unnecessary to perform parameter correction each time the non-multimedia file is played, thereby speeding up a playback process, reducing waiting time of a user, and further improving user experience.

In a practical application, a specific implementation process of the present invention includes:

The media auxiliary file generating unit 01 may generate media auxiliary files 03 for all multimedia files or may generate media auxiliary files 03 only for non-standard multimedia files for which parameter correction has been performed. If a multimedia file is a standard multimedia file, that is, no parameter correction is required, the correction parameter corresponding to the multimedia file may be blank, or there may be no corresponding correction parameter. If the multimedia file is a non-standard multimedia file, when a player plays the non-standard multimedia file for the first time by using a multimedia file playback module 04, the media auxiliary information collecting module 011 obtains the correction parameter that is used by the player to correct a parameter of the non-standard multimedia file. Specifically, one or a combination of any of total duration, start time, end time, or a seek index of the multimedia file that has been corrected by the player may be obtained. After correct parameters, that is, correction parameters are obtained, the media auxiliary information output module 012 stores these correction parameters in the media auxiliary file 03. In this application, a specific format of the correction parameter stored in the media auxiliary file 03 may be that shown in FIG. 2. A format of the media auxiliary file 03 may be a txt file, or may be an XML file or a binary file, or may be another type defined by a user, or may be another format, as long as similar information is included. This is not limited herein.

To make the stored correction parameter correspond to the multimedia file so that the corresponding correction parameter may be easily found when the multimedia file is played, in this application, a file name of the media auxiliary file 03 may further be set to be the same as a file name of the multimedia file. For example, for a multimedia file whose file name is 001.vai, a media auxiliary file 03 generated for the multimedia file may be 001.maf, that is, the file name of the media auxiliary file 03 and the file name of the corresponding multimedia file are the same, and they are identified and distinguished by using a file type.

In another aspect of this application, another multimedia playback system is further provided, where the multimedia playback system includes the multimedia playback apparatus in the previous embodiment. The multimedia playback apparatus in the multimedia playback system in this embodiment has a same structure, working principle, and beneficial effect as those of the multimedia playback apparatus in the previous embodiment. Therefore, details are not described herein again.

Figure 4:
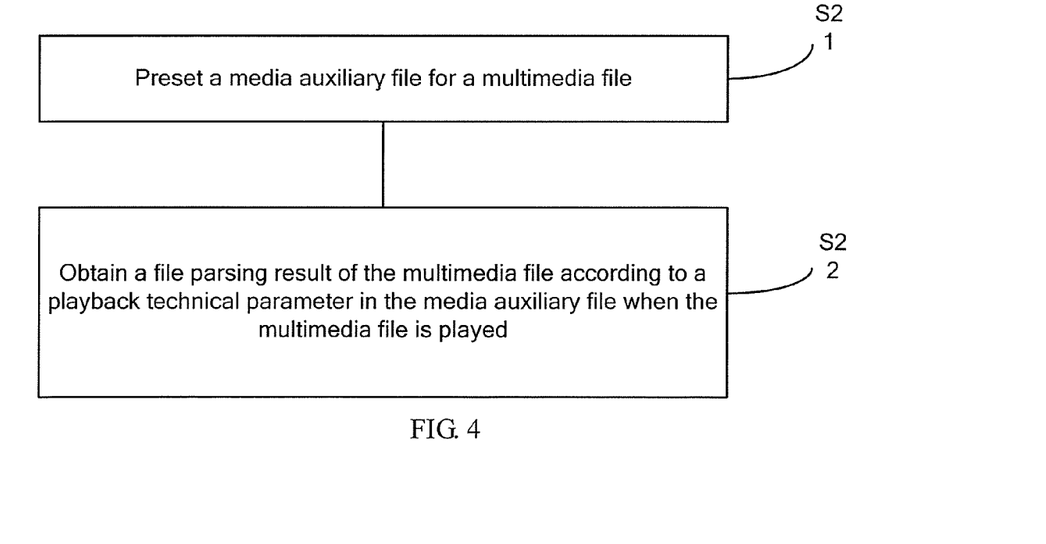
FIG. 4 is a schematic flowchart of another multimedia playback method according to this application.

In another aspect of this application, another multimedia playback method is further provided, as shown in FIG. 4, including the following steps:

S21. When a multimedia file is run for the first time, preset a media auxiliary file for the multimedia file and establish a mapping relationship between the multimedia file and the media auxiliary file, where the media auxiliary file includes a playback technical parameter corresponding to the multimedia file.

In the prior art, to play a multimedia file by using a player, file parsing needs to be first performed on the multimedia file to obtain a playback technical parameter such as a file container type, the number of audio bitstreams, a PID of each audio bitstream, an audio container type, an audio encoding format, the number of video streams, a PID of each video stream, a video encoding format, a video frame rate, or the like. Therefore, each time the multimedia file is played, a user needs to wait during a file parsing process, thereby leading to poor user experience.

Figure 5:
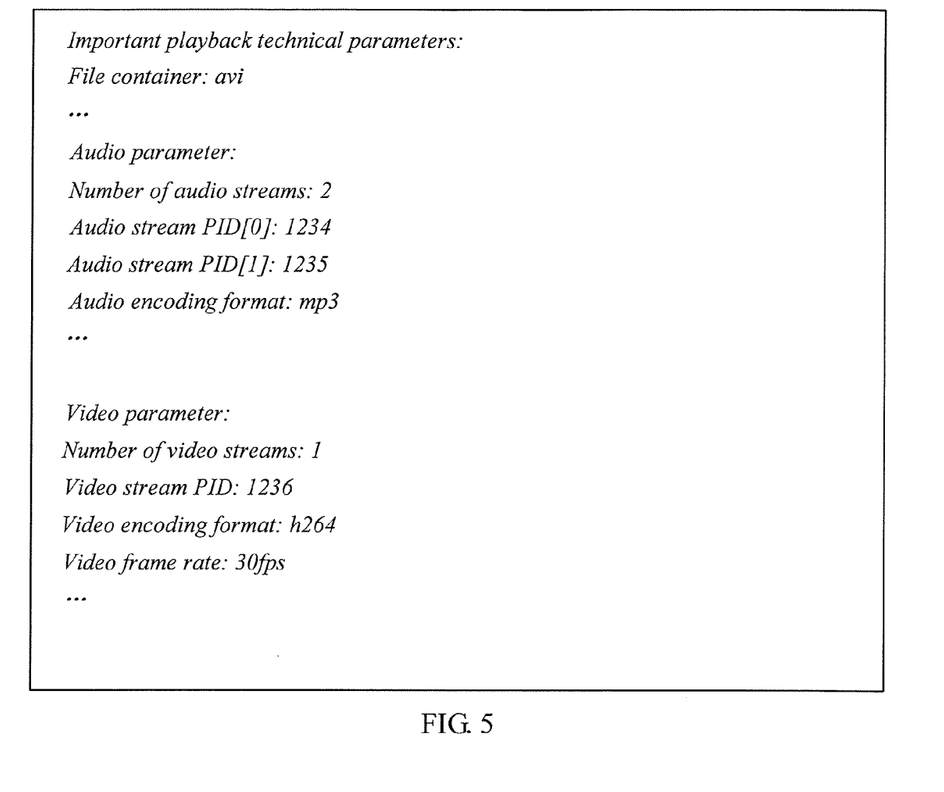
FIG. 5 is a schematic diagram of a format of another media auxiliary file according to this application.

To address the foregoing deficiency, in the present invention, the media auxiliary file is preset for the multimedia file and the mapping relationship between the multimedia file and the media auxiliary file is established, where the media auxiliary file includes the playback technical parameter corresponding to the multimedia file. Specifically, the playback technical parameter in the media auxiliary file is obtained when the file parsing is performed on the multimedia file when the player plays the multimedia file for the first time. Specifically, the playback technical parameter may include one or a combination of any of a file container type, the number of the audio bitstreams, a PID of each audio bitstream, an audio container type, an audio encoding format, the number of the video streams, a PID of each video stream, a video encoding format, and a video frame rate. In this application, a specific format of the playback technical parameter that is stored in the media auxiliary file may be that shown in FIG. 5. A format of the media auxiliary file may be a txt file, or may be an XML file or a binary file, or may be another type defined by a user, or may be another format, as long as similar information is included. This is not limited herein.

To make the stored playback technical parameter correspond to the multimedia file so that the corresponding playback technical parameter may be easily found when the multimedia file is played, in this application, a file name of the media auxiliary file may further be set to be the same as a file name of the multimedia file. For example, for a multimedia file whose file name is 001.vai, a media auxiliary file generated for the multimedia file may be 001.maf, that is, the file name of the media auxiliary file and the file name of the corresponding multimedia file are the same, and they are identified and distinguished by using a file type.

S22. When the multimedia file is played again, search for the media auxiliary file according to the mapping relationship, and obtain a file parsing result of the multimedia file according to the corresponding playback technical parameter in the media auxiliary file.

When the multimedia file is played for the first time, the media auxiliary file has already been generated, and the playback technical parameter of the multimedia file has been saved. Therefore, when the multimedia file is played again, the corresponding media auxiliary file may be found according to the mapping relationship between the multimedia file and media auxiliary file, and the file parsing result of the multimedia file may be directly obtained by using the playback technical parameter in the media auxiliary file. Therefore, it is unnecessary to repeat a file parsing process for the multimedia file, thereby speeding up a playback process, reducing waiting time of a user, and further improving user experience.

Figure 6:
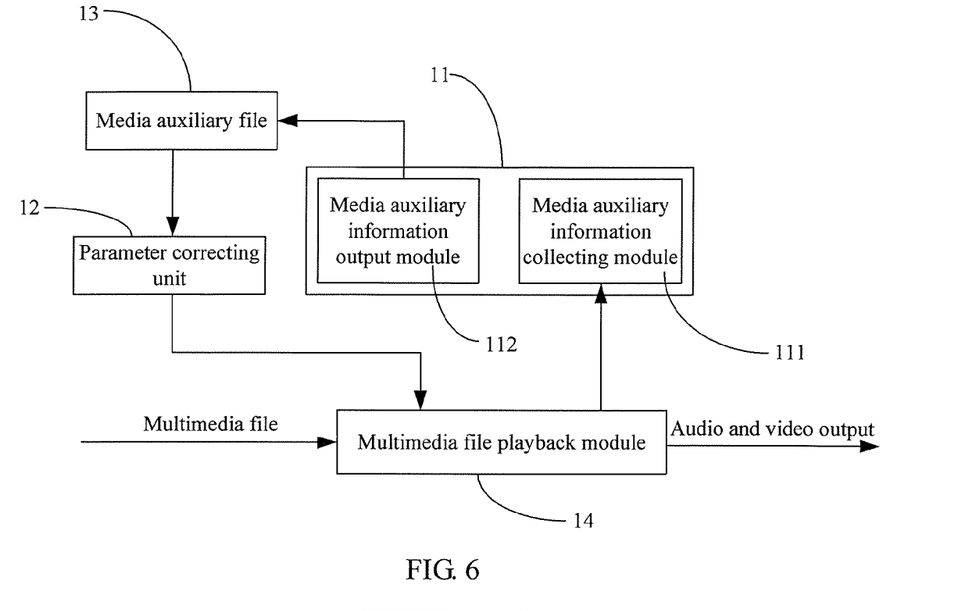
FIG. 6 is a schematic structural diagram of another multimedia playback apparatus according to this application.

Corresponding to the embodiment of the multimedia playback method shown in FIG. 4, in another aspect of this application, a multimedia playback apparatus is further provided, as shown in FIG. 6, including: a media auxiliary file generating unit 11, configured to preset a media auxiliary file 13 for a multimedia file, where the media auxiliary file 13 includes a playback technical parameter corresponding to the multimedia file; and a parameter correcting unit 12, configured to, when the multimedia file is played again, search for the media auxiliary file 13 according to a mapping relationship, and correct the multimedia file according to a correction parameter in the media auxiliary file 13.

In the prior art, to play a multimedia file by using a multimedia file playback module 14 of a player, file parsing needs to be first performed on the multimedia file to obtain playback technical parameters including a file container type, the number of audio bitstreams, a PID of each audio bitstream, an audio container type, an audio encoding format, the number of video streams, a PID of each video stream, a video encoding format, a video frame rate, or the like. Therefore, each time the multimedia file is played, a user needs to wait during a file parsing process, thereby leading to poor user experience.

To address the foregoing deficiency, in the present invention, the media auxiliary file generating unit 11 presets the media auxiliary file 13 for the multimedia file, where the media auxiliary file 13 includes the playback technical parameter corresponding to the multimedia file. Specifically, the media auxiliary file generating unit 11 may include a media auxiliary information collecting module 111 and a media auxiliary information output module 112; when the multimedia file is played for the first time by using the multimedia file playback module 14 of the player, the playback technical parameter in the media auxiliary file 13 is obtained by using the media auxiliary information collecting module 111 when the file parsing is performed on the multimedia file; and then the playback technical parameter is stored in the media auxiliary file 13 by using the media auxiliary information output module 112. Specifically, the playback technical parameter may include one or a combination of any of a file container type, the number of audio bitstreams, a PID of each audio bitstream, an audio container type, an audio encoding format, the number of video streams, a PID of each video stream, a video encoding format, and a video frame rate. In this application, a specific format of the playback technical parameter that is stored in the media auxiliary file may be that shown in FIG. 5. A format of the media auxiliary file may be a txt file, or may be an XML file or a binary file, or may be another type defined by a user, or may be another format, as long as similar information is included. This is not limited herein.

To make the stored playback technical parameter correspond to the multimedia file so that the corresponding playback technical parameter may be easily found when the multimedia file is played, in this application, a file name of the media auxiliary file may further be set to be the same as a file name of the multimedia file. For example, for a multimedia file whose file name is 001.vai, a media auxiliary file generated for the multimedia file may be 001.maf, that is, the file name of the media auxiliary file and the file name of the corresponding multimedia file are the same, and they are identified and distinguished by using a file type.

When the multimedia file playback module 14 plays the multimedia file for the first time, the media auxiliary file generating unit 11 has already generated the media auxiliary file and saved the playback technical parameter of the multimedia file. Therefore, when the multimedia file is played again, the file parsing result of the multimedia file may be directly obtained by using the parameter correcting unit 12 to acquire the playback technical parameter in the media auxiliary file 13. Therefore, it is unnecessary to repeat a file parsing process for the multimedia file, thereby speeding up a playback process, reducing waiting time of a user, and further improving user experience.

In another aspect of this application, another multimedia playback system is further provided, where the multimedia playback system includes the multimedia playback apparatus in the previous embodiment. The multimedia playback apparatus in the multimedia playback system in this embodiment has a same structure, working principle, and beneficial effect as those of the multimedia playback apparatus in the previous embodiment. Therefore, details are not described herein again.

Figure 7:
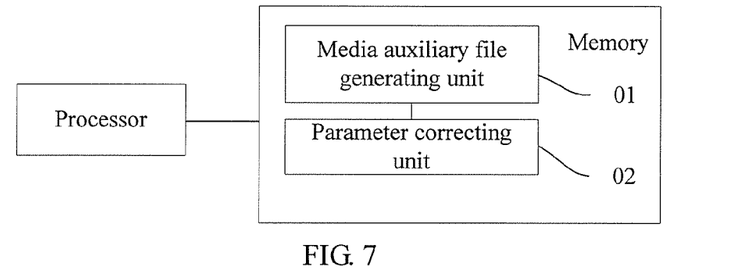
FIG. 7 is a schematic diagram of hardware composition of a multimedia playback apparatus according to this application.

Furthermore, an embodiment of a present invention further provides hardware composition of the multimedia playback apparatus. At least one processor (such as a CPU) and at least one memory are included. The processor is configured to execute an executable module, such as a computer program, stored in the memory. The memory may include a high-speed random access memory (RAM) and may further include a non-volatile memory (non-volatile memory), for example, at least one magnetic disk memory. A communication connection between a system gateway and at least one other network element is implemented by using at least one network interface (may be wired or wireless), and the Internet, a wide area network, a local area network, a local network, a metropolitan area network, and the like can be used, Referring to FIG. 7, in some implementation manners, program instructions are stored in a memory, and the program instructions can be executed by a processor. The program instructions include a media auxiliary file generating unit 01 and a parameter correcting unit 02. For specific implementation of each unit, refer to a corresponding unit disclosed in FIG. 3.

Figure 8:
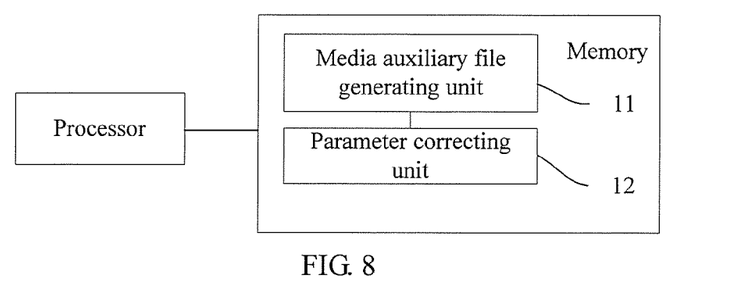
FIG. 8 is a schematic diagram of hardware composition of another multimedia playback apparatus according to this application.

Referring to FIG. 8, in some implementation manners, it may also be that program instructions are stored in a memory, and the program instructions can be executed by a processor. The program instructions include a media auxiliary generating unit 11 and a parameter correcting unit 12. For specific implementation of each unit, refer to a corresponding unit disclosed in FIG. 6.

The solutions in the present invention may be described in a general context of a computer executable instruction performed by a computer, such as a program unit. Generally, a program unit includes a routine, a program, an object, a component, a data structure, and the like for performing a specific task or implementing a specific abstract data type. The solutions in the present invention may also be practiced in distributed computing environments. In these distributed computing environments, a task is performed by a remote processing device that is connected by using a communications network. In a distributed computing environment, program units may be located in local and remote computer storage mediums including a storage device.

The embodiments of the present specification are described in a progressive manner. The same or similar parts of the embodiments can be referenced mutually. The focus of each embodiment is placed on a difference from other embodiments. Especially, for the apparatus embodiments, as they are fundamentally similar to the method embodiments, their description is simplified, and for relevant parts, reference may be made to the description of the method embodiments. The apparatus embodiments described above are merely exemplary. The units described as separate parts may or may not be physically separate, and parts displayed as units may or may not be physical units, may be located in one position, or may be distributed on a plurality of network units. A part or all of the modules may be selected according to an actual need to achieve the objectives of the solutions of the embodiments. A person of ordinary skill in the art may understand and implement the embodiments of the present invention without creative efforts.

The forgoing describes in detail the embodiments of the present invention. Specific implementation manners are used in this specification to describe the present invention. The descriptions of the foregoing embodiments are merely intended to help understand the method and equipment of the present invention. In addition, a person of ordinary skill in the art may make modifications to the implementation manners and the application scope according to the idea of the present invention. Therefore, this specification shall not be construed as a limitation on the present invention.

What is claimed is:

1. A multimedia playback method, comprising:
   when a multimedia file is played for the first time, generating a media auxiliary file for the multimedia file and establishing a mapping relationship between the multimedia file and the media auxiliary file, wherein the media auxiliary file comprises a correction parameter that is used to correct a parameter of the multimedia file; and
   when the multimedia file is played again, searching for the media auxiliary file according to the mapping relationship, and correcting the multimedia file according to the correction parameter in the media auxiliary file.

2. The method according to claim 1, wherein the correction parameter comprises:
   a parameter that is used to correct at least one of total duration, start time, end time, and a seek index of the multimedia file.

3. The method according to claim 2, wherein the mapping relationship comprises that a file name of the media auxiliary file is the same as a file name of the multimedia file.

4. A multimedia playback method, comprising:
   when a multimedia file is run for the first time, presetting a media auxiliary file for the multimedia file and establishing a mapping relationship between the multimedia file and the media auxiliary file, wherein the media auxiliary file comprises a playback technical parameter corresponding to the multimedia file; and
   when the multimedia file is played again, searching for the media auxiliary file according to the mapping relationship, and acquiring a file parsing result of the multimedia file according to the corresponding playback technical parameter in the media auxiliary file.

5. The method according to claim 4, wherein the playback technical parameter comprises:
   one or a combination of any of a file container type, the number of audio bitstreams, a PID of each audio bitstream, an audio container type, an audio encoding format, the number of video streams, a PID of each video stream, a video encoding format, and a video frame rate.

6. The method according to claim 5, wherein a file name of the media auxiliary file is the same as a file name of the corresponding multimedia file.

7. A multimedia playback apparatus, comprising:
   a media auxiliary file generating unit, configured to, when the multimedia file is run for the first time, generate a media auxiliary file for a multimedia file and establish a mapping relationship between the multimedia file and the media auxiliary file, wherein the media auxiliary file comprises a correction parameter that is used to correct a parameter of the multimedia file; and
   a parameter correcting unit, configured to, when the multimedia file is played again, search for the media auxiliary file according to the mapping relationship, and correct the multimedia file according to the correction parameter in the media auxiliary file.

8. The apparatus according to claim 7, wherein the correction parameter comprises:
   a parameter that is used to correct at least one of total duration, start time, end time, and a seek index of the multimedia file.

9. The apparatus according to claim 8, wherein a file name of the media auxiliary file is the same as a file name of the corresponding multimedia file.

10. A multimedia playback apparatus, comprising:
    a media auxiliary file generating unit, configured to, when the multimedia file is run for the first time, preset a media auxiliary file for a multimedia file and establish a mapping relationship between the multimedia file and the media auxiliary file, wherein the media auxiliary file comprises a playback technical parameter corresponding to the multimedia file; and
    a parameter correcting unit, configured to, when the multimedia file is played again, search for the media auxiliary file according to the mapping relationship, and acquire a file parsing result of the multimedia file according to a corresponding playback technical parameter in the media auxiliary file.

11. The apparatus according to claim 10, wherein the playback technical parameter comprises:

one or a combination of any of a file container type, the number of audio bitstreams, a PID of each audio bitstream, an audio container type, an audio encoding format, the number of video streams, a PID of each video stream, a video encoding format, and a video frame rate.

12. The apparatus according to claim 11, wherein a file name of the media auxiliary file is the same as a file name of the corresponding multimedia file.

\* \* \* \* \*